United States Patent [19]
Erickson et al.

[11] Patent Number: 5,613,099
[45] Date of Patent: Mar. 18, 1997

[54] PERSISTENT OBJECT STORAGE SYSTEM WITH MODIFIABLE GROUP SKELETAL FORMATS

[75] Inventors: Charles R. Erickson, Cedar Park; Roger H. Sessions, Austin, both of Tex.

[73] Assignee: International Business Machines Corporation, Armonk, N.Y.

[21] Appl. No.: 409,109

[22] Filed: Mar. 23, 1995

Related U.S. Application Data

[63] Continuation of Ser. No. 18,608, Feb. 17, 1993, abandoned.

[51] Int. Cl.$^6$ ........................................... G06F 7/00
[52] U.S. Cl. ................. 395/500; 395/200.17; 395/614; 364/DIG. 2; 364/962
[58] Field of Search ........................ 395/500, 600, 395/200, 200.01, 200.17, 200.18; 364/DIG. 1 MS File, DIG. 2 MS File

[56] References Cited

U.S. PATENT DOCUMENTS

| | | | |
|---|---|---|---|
| 5,161,223 | 11/1992 | Abraham | 395/600 |
| 5,161,225 | 11/1992 | Abraham et al. | 395/600 |
| 5,247,669 | 9/1993 | Abraham et al. | 395/600 |
| 5,265,206 | 11/1993 | Shackelford et al. | 395/200 |
| 5,291,583 | 3/1994 | Bapat | 395/500 |
| 5,291,593 | 3/1994 | Abraham et al. | 395/600 |
| 5,297,279 | 3/1994 | Bannon et al. | 395/600 |
| 5,317,730 | 5/1994 | Moore et al. | 395/600 |

OTHER PUBLICATIONS

"Organizing and Typing Persistent Objects within an Object-Oriented Framework", by P. Madany and R. Campbell, IEEE, System Sciences, 1992 Annual Hawaii Int'l., Jan. 1992, pp. 800–809.

"A generic persistent object store", by A. Brown and R. Morrison, IEEE, Software Engineering Journal, Mar. 1992, pp. 161–168.

"A Persistent Class Store for Choices", by S. Berman and K. MacGregor, IEEE, Object Orientation in Operating Systems, 1992 Int'l. Workshop, Sep. 1992, pp. 352–359.

"Exercising Application Specific Run-time Control Over Clustering of Objects", by S. Wheater and S. Shrivastava, IEEE, Configurable Distributed Systems, 1994 Int'l. Workshop, Jun. 1994, pp. 72–81.

*Primary Examiner*—Kevin J. Teska
*Assistant Examiner*—Russell W. Frejd
*Attorney, Agent, or Firm*—Mark S. Walker

[57] ABSTRACT

A system of modifiable group skeletal formatting of persistent objects. The object oriented framework provides abstract classes for persistent object grouping and storage. Abstract classes define the interfaces and allow implementation details to be deferred until runtime. The implementor creates subclasses overriding the abstract methods and implementing specific group skeletal formats. Multiple formats can be defined and object instance variables set to indicate which formatter to use. The defined interfaces and methods allows interchangeable substitution of group formatters.

11 Claims, 3 Drawing Sheets

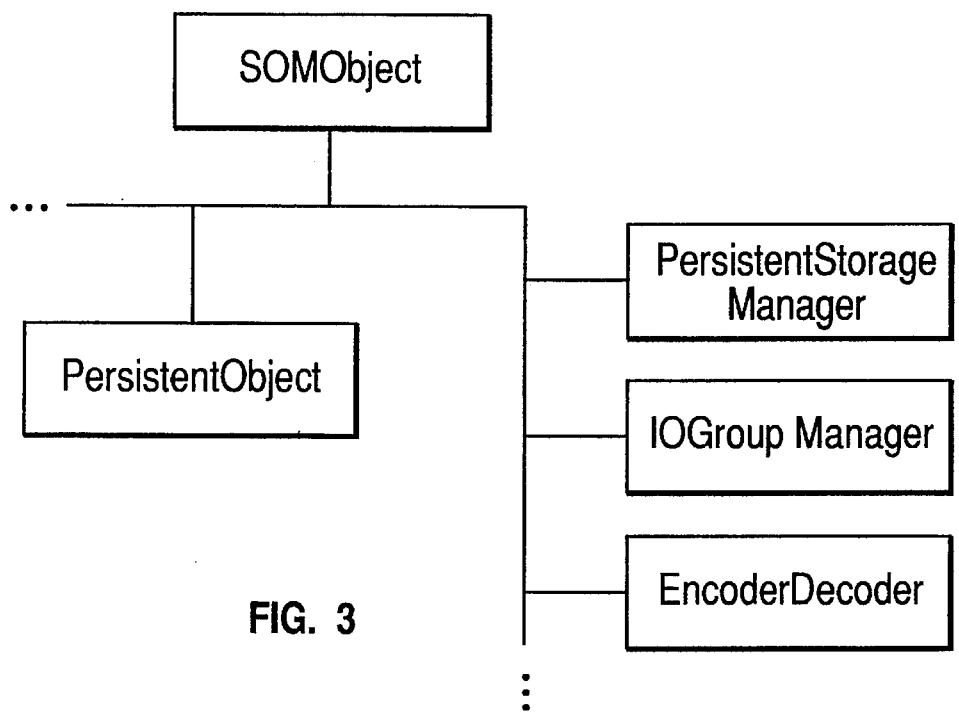
FIG. 3
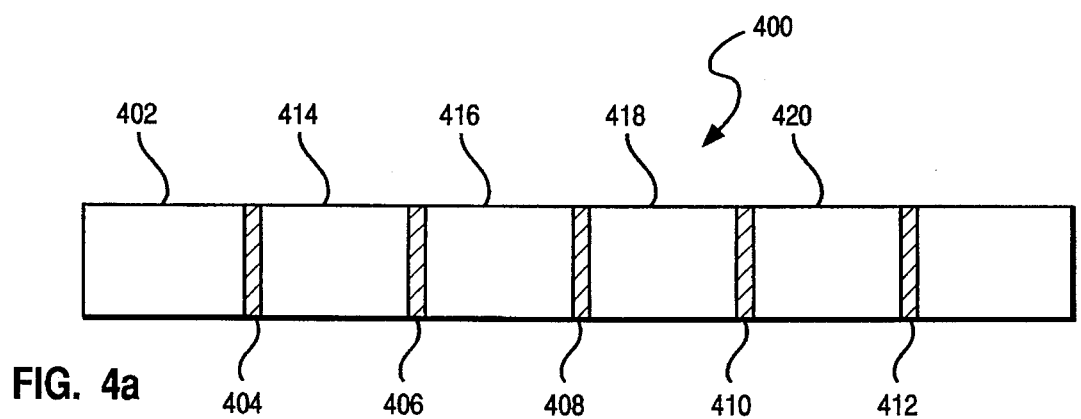
FIG. 4a
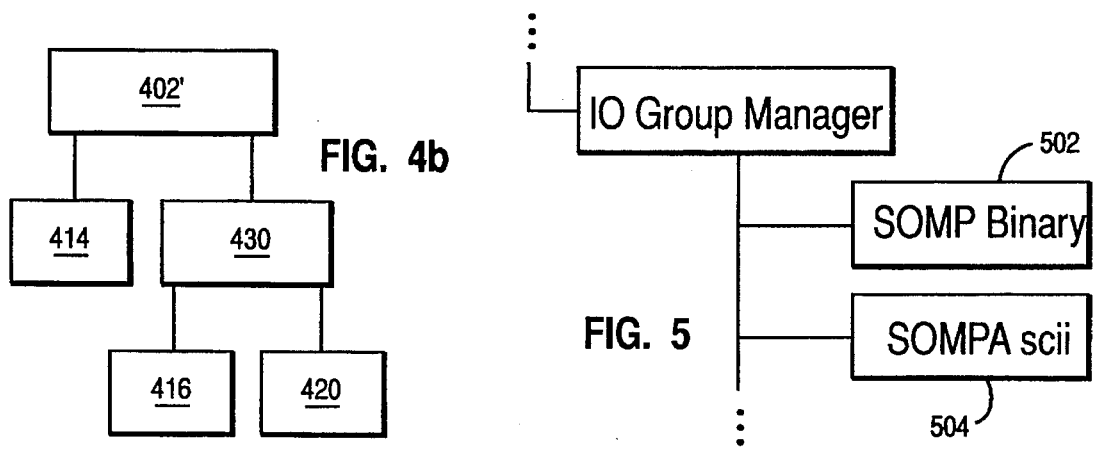
FIG. 4b
FIG. 5

PERSISTENT OBJECT STORAGE SYSTEM WITH MODIFIABLE GROUP SKELETAL FORMATS

This application is a continuation of application Ser. No. 08/018,608, filed Feb. 17, 1993, now abandoned.

BACKGROUND OF THE INVENTION

1. Field of the Invention

The present invention relates to data processing systems and snore particularly to systems for creating application programs or operating system programs. Still more particularly, the present invention relates to object oriented systems having tailorable persistent object storage functions.

2. Background and Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of new software systems.

Object oriented programming uses a toolkit of system objects that can be assembled to perform the final task.

Object oriented programming uses a toolkit of system objects that can be assembled to perform the final task. Each object has certain data attributes and processes or methods that operate on that data. Data is said to be "encapsulated" by an object and can only be modified by the object methods. Methods are invoked by sending a message to an object identifying the method and supplying any needed arguments.

Object oriented systems have two important properties in addition to encapsulation. "Inheritance" is the ability to derive a new object from an existing object and inherit all properties, including methods and data structure, from the existing object. The new object may have certain unique features which are supplied as overrides or modifications to the existing class. I.e. a new subclass needs to specify only the functions and data that distinguish that class from the existing more general class.

The ability to override an existing method description is termed polymorphism because a single message to an object can be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system.

Objects created by a data processing system are typically maintained in the volatile memory of those systems. This allows faster processing, but does not provide a means to store data. Object oriented systems solve this problem by implementing "persistent objects." "Persistence" means that an object's state can be preserved beyond the termination of the process that created that object. The persistent framework includes methods that allow persistent objects to be stored in and retrieved from a non-volatile medium such as a hard disk drive or writable optical disk. Objects can be stored individually or grouped with other objects.

The use of Persistent Streams to capture and retain database queries and results is discussed in U.S. Pat. No. 5,161,225 to Abraham et al., commonly assigned.

Existing persistent object systems are limited by their fixed implementation of object storage. A particular object oriented product typically provides one mechanism for storing persistent objects. This mechanism includes a definition of the non-volatile medium used, the structure of object groups stored on the medium and the structure of each particular object stored on the medium.

Fixed implementations of persistent objects limit the developer flexibility to change persistent object storage to meet particular system requirements. The developer may want to change to improve individual object storage efficiency by compression, or to enhance security through encryption. Object group structure may need to be changed to implement new technologies such as object oriented databases or to allow interchange of objects between systems having different persistent object group structures.

The existing technical problem addressed by the present invention is to provide a persistent object framework that allows developer modification of group skeletal formats used for object group storage.

SUMMARY OF THE INVENTION

It is therefore an object of the present invention to provide a persistent object system that allows the developer to override the object group skeletal format.

It is yet another object of the invention to provide an object framework that is developer extensible to allow modification of persistent object group storage by the developer and to allow multiple formats to be specified and selected by the objects at run time.

The present invention is directed to providing an object oriented system with persistent object classes with object storage formats that can be overridden by the developer at run time. The present system allows object subclasses to be created that implement modified object storage structures that are dynamically referenced by the system.

The present invention is directed to a system for storing customizable persistent objects and includes an adaptable formatting means for specifying a persistent object group storage format, a means for requesting storage of a persistent object, and a means for removably attaching said adaptable formatting means to said means for requesting storage.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIG. 3 is a hierarchical representation of classes in the preferred embodiment.

FIG. 4a and 4b are illustrates of possible media format layouts according to the present invention.

FIG. 5 is a hierarchical representation of concrete classes implementing group skeletal formats according to the present invention.

DETAILED DESCRIPTION

The preferred embodiment will be described with reference to the above figures.

Figure 1:
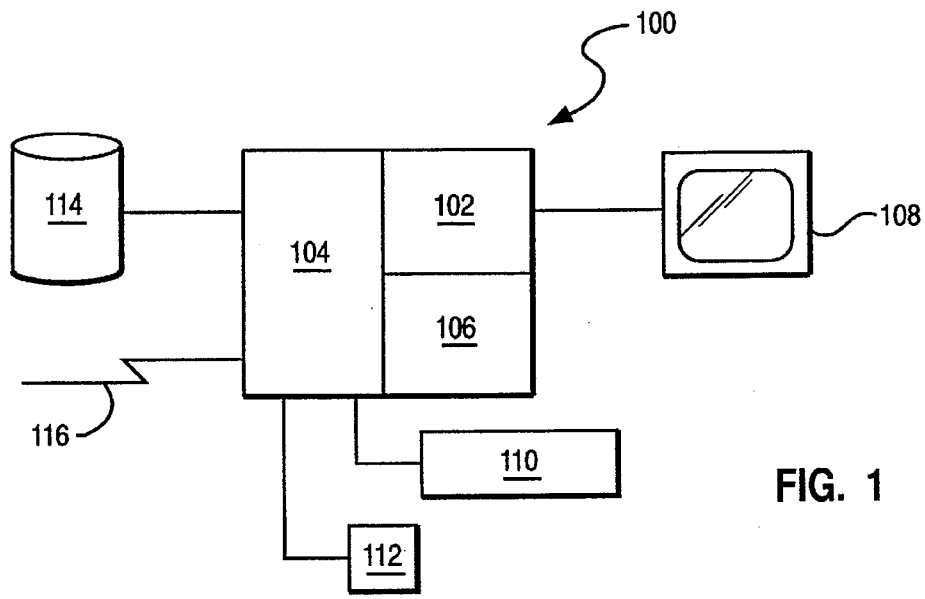
FIG. 1 is a block diagram of system on which the present invention operates.

An object oriented programming system operates on a computer system such as that shown in FIG. 1. The computer system can be a "Personal Computer", workstation, minicomputer or mainframe type of computer. FIG. 1 illustrates a personal computer such as the IBM PS/2 Model 95 computer (IBM and PS/2 are trademarks of the IBM Corporation. ) The computer typically includes a system unit 100 which contains a processor or CPU 102 and memory 104. An object oriented program 106 operates on the processor and is resident in memory 104. The system will typically have a display device 108 such as a color or monochrome CRT, a keyboard 110, a pointing device 112 such as a mouse or trackball, a fixed disk drive 114, and optionally, a network connection 116 to a LAN or other network.

Figure 2:
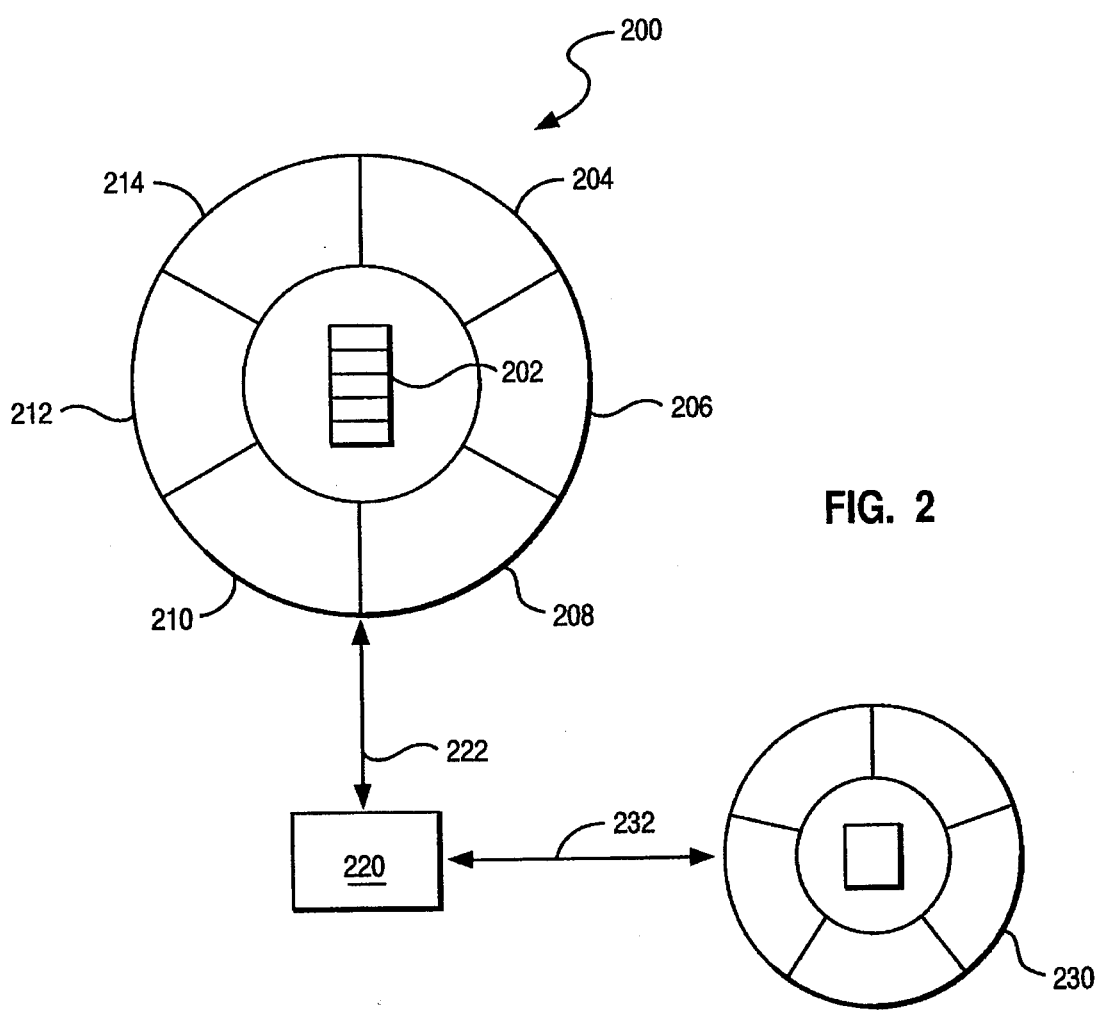
FIG. 2 is an illustration of an object according to the present invention.

An object encapsulates data and the methods needed to operate on that data. Objects can be represented by a "doughnut diagram" such as shown in FIG. 2. Object data is shown in the center 202 surrounded by the applicable methods 204 to 214. Data 202 may be modified only by the methods of that object. Methods 204–214 are invoked by receiving messages from other objects. A typical object oriented system will have a message router 220 that routes messages between objects. Thus, object 230 causes Method C 208 to be invoked by sending a message 232 to the message router 220 that in turn sends it 222 to Method C 208 of object 200.

Object frameworks are constructed to provide a set of objects for, application and system developers to use to construct a delivered system. The IBM System Object Model (SOM) framework, for example, provides a language independent set of objects for use in systems development. The IBM OS/2 Version 2.0 Workplace Shell is an example of an application developed using such an environment.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog-type" and "dog-name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Classes in an object oriented system are often derived from a single base class. This base class is named "SOMObject" in the IBM System Object Model. FIG. 3 illustrates the preferred embodiment of the present invention by showing the class hierarchy for Persistent Objects using the System Object Model.

The class "PersistentObject" 304 is a subclass of SOMObject 302 and contains the methods and variables necessary to create persistent objects. Because it is a subclass of SOMObject it inherits all methods and variables known to SOMObject. Also derived from SOMObject 302 are PersistentStorageManager 306, IOGroupManager 308, and EncoderDecoder 310. These subclasses are abstract classes for implementing overall management of persistent objects (PersistentStorageManager), for controlling the structure and grouping of persistent objects on the persistent object storage medium (IOGroupManager), and for writing object information to the storage medium (EncoderDecoder.)

The IOGroupManager abstract class 308 controls the grouping and organization of groups of objects on the persistent storage medium. Persistent objects are stored in related groups of objects. The structure of object group storage is called the Group Skeletal Format and defines a skeleton within which the objects are stored. The most straightforward structure is storing the object description in plain ASCII text with objects stored sequentially within a group. FIG. 4a illustrates the group skeletal format for this object structure.

The group skeletal format 400 contains a Object Group Header 402 that contains group data, a number of object separators 404 406 ... 412 and object storage blocks 414 416 ... 420. Storage of objects within a storage block 414 is controlled by the EncoderDecoder class.

FIG. 4b illustrates a group skeletal format with a more complex binary tree storage structure. This structure has an Object Group Header 402, an intermediate index nodel 430 and object storage blocks 414 416 420.

The preferred embodiment of the present invention implements modifiable group skeletal formats by providing the linkages that allow the application developer to specify the group skeletal format at run time. These linkages define the methods that can be overridden by concrete classes. Developers of other parts of the framework can provide objects that use the IOGroupManager methods without the implementation details of those methods being defined. The implementation details will be found in an object of the concrete class accessed at run time.

A specific group skeletal format is implemented by creating subclasses under the IOGroupManager. FIG. 5 illustrates the resulting hierarchy. The modifiable structure permits multiple group skeletal formats to be defined. Each persistent object has an instance variable indicating the name of the group skeletal format object it will use for grouping objects on the persistent medium.

FIG. 5 shows two concrete classes under the abstract class IOGroupManager. The example concrete classes are SOMPBinary 502 and SOMPAscii 504.

Figure 6A:
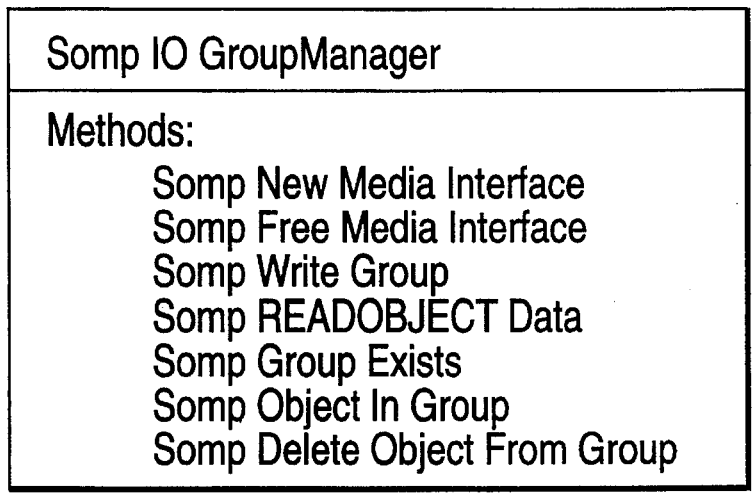
FIG. 6a and 6b are object descriptions of portions of group skeletal format objects according to the present invention.
Figure 6B:
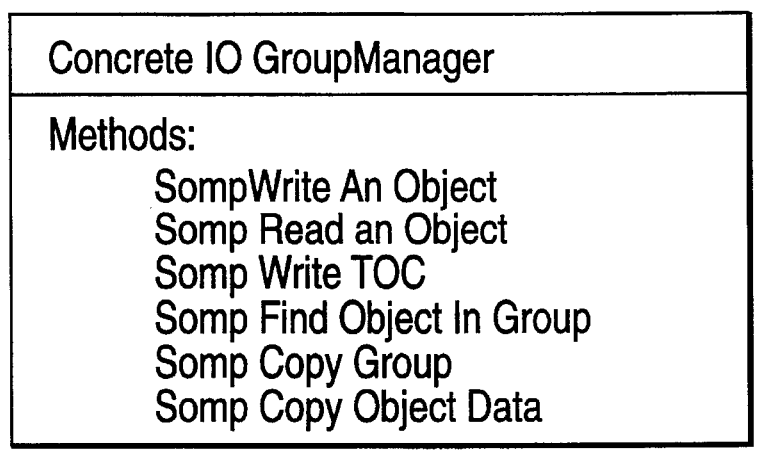

FIG. 6a illustrates the method stubs contained in IOGroupManager while FIG. 6b illustrates object methods provided by a concrete class.

Application developers using this approach can create group skeletal formats that are very different from existing formats by creating a new concrete class as a subclass of IOGroupManager. Group skeletal formats that differ only slightly from existing formats can be created by subclassing an existing concrete class such as SOMPAscii.

Figure 7:
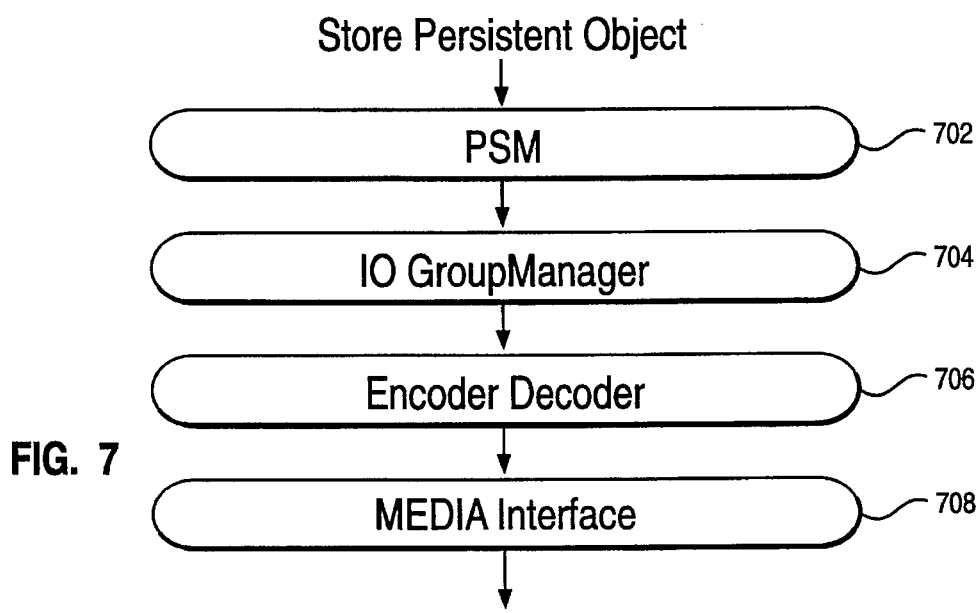
FIG. 7 is a flow chart illustrating the flow of messages between objects in a system according to the present invention.

The resulting system stores a persistent object in persistent storage by the following process (see FIG. 7.) Storage of an object would be triggered by a message to "StoreObject" 702 invoking a method of the PersistentStorageManager or a subclass. The PersistentStorageManager collects information 704 about the object to be stored and determines all dependencies that object has on other objects. The PersistentStorageManager will ensure that all related objects are stored together. For example, a "phoneDirectory" object may point to several "directoryEntry" objects containing name, telephone number, and address entries. When the "phoneDirectory" is saved to persistent storage all related "directoryEntry" objects also should be saved. The PersistentStorageManager instantiates an IOGroupManager subclass identified in the persistent object variable and then sends it a message to store the persistent object and those grouped with it 706. The IOGroupManager establishes the skeletal format and readies the medium. The IOGroupManager instantiates an EncoderDecoder subclass identified in the persistent object. The IOGroupManager then sends a message to the EncoderDecoder object to format each object of the group 706. Finally, a message is sent to the MediaInterface subclass to write the data to the persistent medium 708.

The flexible persistent object structure greatly expands the application developer's ability to control the format of persistent objects. The use of defined interfaces and methods ensures that specific object classes can be replaced with new or different classes as the application demands. Use of interchangeable subclasses extends the power and reusability of those subclasses. This structure also ensures that the application does not become obsolete merely because a persistent object format changes to implement new standards or media.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A persistent object system having modifiable object group storage formatting, the system comprising:

group formatting interface means for specifying a single set of method interfaces for persistent object group storage formatting;

means for receiving a request to store a persistent object from an object oriented computer program, said storage request invoking one of said set of method interfaces and including a group storage format type;

means for specifying a plurality of system object group storage formatting methods each responsive to said group formatting interface means and having a plurality of formatting properties, said methods specifying a physical format for storing a persistent object on a storage device;

means for specifying a plurality of custom object group storage formatting methods responsive to said group formatting interface means, said means for specifying a custom object group storage formatting method causing said custom method to inherit one or more of said properties of one of said system object group storage formatting methods and to override one or more of said properties;

means for invoking one of said plurality of system object group storage formatting methods or custom object group storage formatting methods, said means for invoking being responsive to said group storage format type said request to store a persistent object received by said means for receiving, said invoked method formatting said persistent object into a formatted object for storage.

2. The system of claim 1, further comprising:

storage means for storing said formatted object on a storage medium, said storage means operating in response to completion of said invoked object group storage formatting method.

3. The system of claim 2, further comprising:

means for managing persistent objects, said means for managing responsive to said request to store said persistent object to track object storage requests and responsive to said group formatting interface means for storing the format in which said object was stored.

4. A system for storing groups of persistent objects formatted according to an object group storage format specified at system runtime, the system comprising:

group formatting interface means for specifying a single set of method interfaces for persistent object group storage formatting;

means for requesting storage of a persistent object by invoking one of said set of method interfaces and specifying a group storage format type;

means for specifying a plurality of system object group storage formatting methods each responsive to one of said group formatting interface means methods and each having a plurality of properties;

means for specifying a plurality of custom object group storage formatting methods, each inheriting properties from one of said plurality of system object group storage formatting methods and overriding one or more of said properties;

means for selecting one of said plurality of system or custom object group storage formatting methods in response to the group storage format type received by said means for requesting storage of a persistent object; and means for formatting said persistent object into an object group storage format using said selected object group storage formatting method; and means for storing said formatted persistent object.

5. A computer implemented method of selecting a persistent object group storage format at runtime, the method comprising the steps of:

storing group storage format interface definitions defining group storage formatting operations;

binding said group storage format interface definitions into a persistent object system;

storing a plurality of custom group storage formatting procedures for formattinq and storing groups of persistent objects, each of said procedures responsive to one of said group storage format interfaces; and selecting one of said plurality of group storage formatting procedures in response to an object storage request invocation of one of said group storage format interfaces.

6. The method of claim 5, wherein said step of storing a plurality of custom group storage formatting procedures includes generating a subclass of said group storage format interface definitions and overriding one or more of said group storage formatting operations.

7. The method of claim 5, wherein said group storage formatting procedures include procedures for writing a group to storage, reading a group from storage, determining whether an object is in a group, placing an object in a group, and deleting an object from a group.

8. The method of claim 6, wherein said step of selecting includes the steps of:

evaluating said object storage request to determine an object class for said object storage request; and selecting a group storage formatting procedure based upon said object class.

9. A computer implemented method of selecting at system runtime a group skeletal format for storing a persistent object, wherein said group skeletal format is specified in said system as one of a plurality of properties of said persistent object, the method comprising the steps of:

storing a specification of an abstract group skeletal format class containing a definition of all group skeletal format method interfaces;

binding said abstract class into an object oriented framework;

storing a specification of a plurality of custom concrete group skeletal format classes as subclasses of said abstract group skeletal format class;

storing with said persistent object one of said plurality of custom concrete group skeletal format classes;

receiving an abstract method interface invocation request to store a persistent object; and selecting a group skeletal format method with which to format said persistent object in response to said received request based upon said persistent object stored concrete group skeletal format class, said stored abstract method interface invocation, and said stored custom concrete group skeletal format subclasses.

10. The method of claim 9, further comprising the steps of:

storing said formatted persistent object in group storage on a storage medium.

11. The method of claim 10, further comprising the step of:

retrieving an object from said storage medium in response to an object retrieval request.

* * * * *